Sept. 8, 1953 C. G. VONK 2,651,693
WATER VOLUME CONTROL
Filed May 19, 1948 2 Sheets-Sheet 1
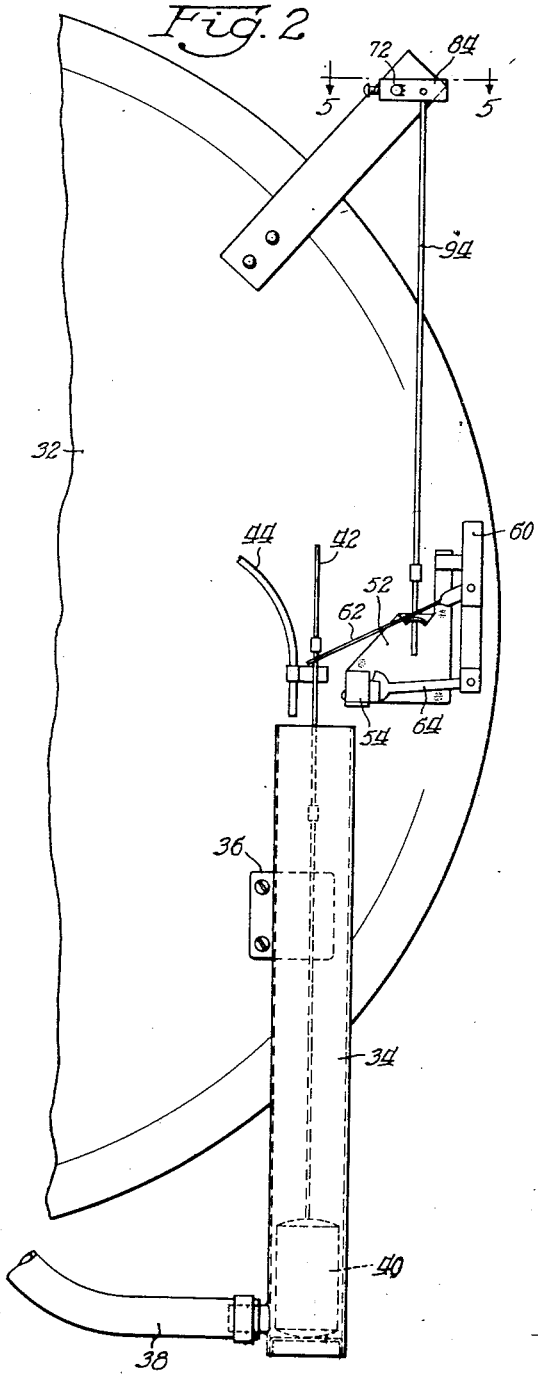
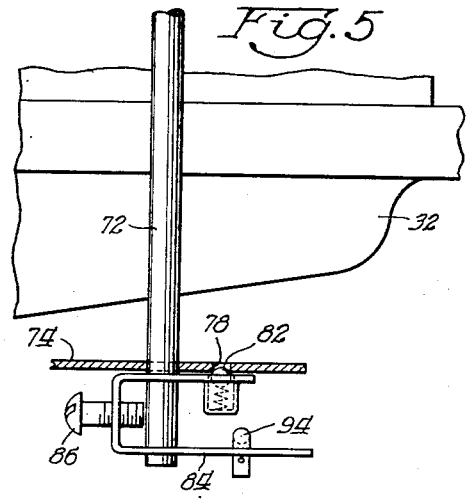
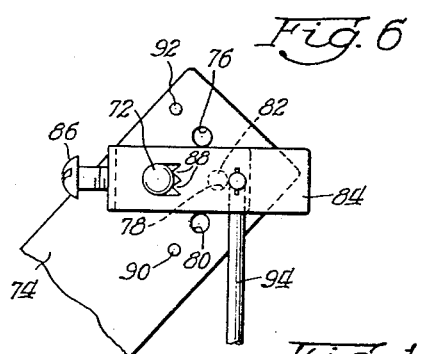
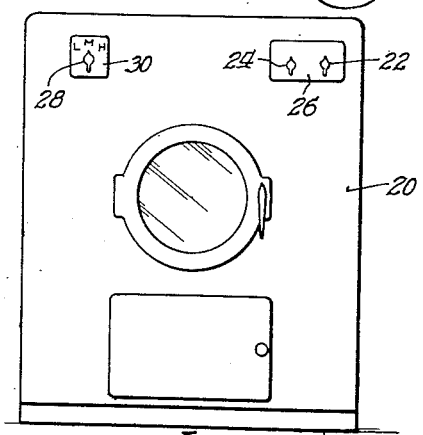
Inventor:
Cornelius G. Vonk Sept. 8, 1953 C. G. VONK 2,651,693
WATER VOLUME CONTROL
Filed May 19, 1948 2 Sheets-Sheet 2
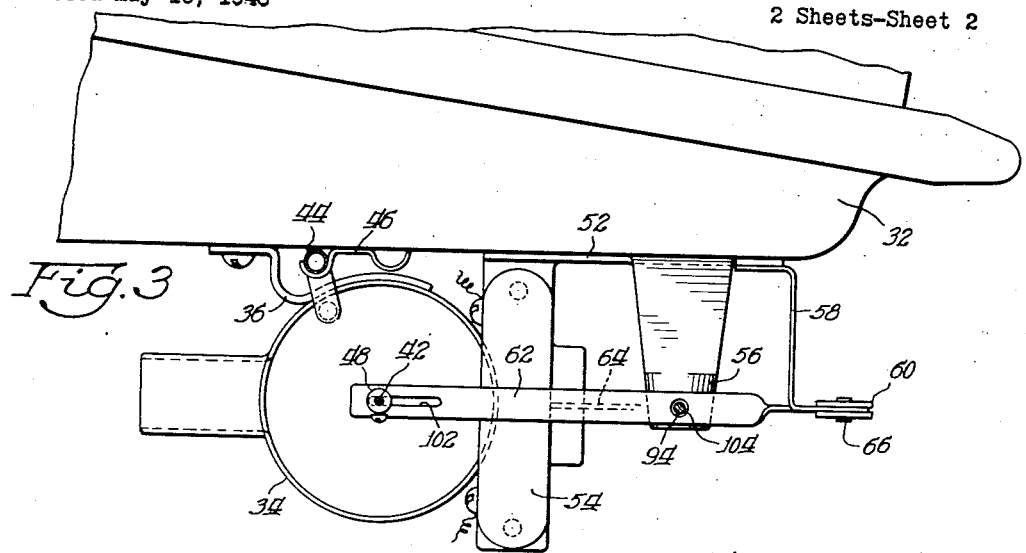
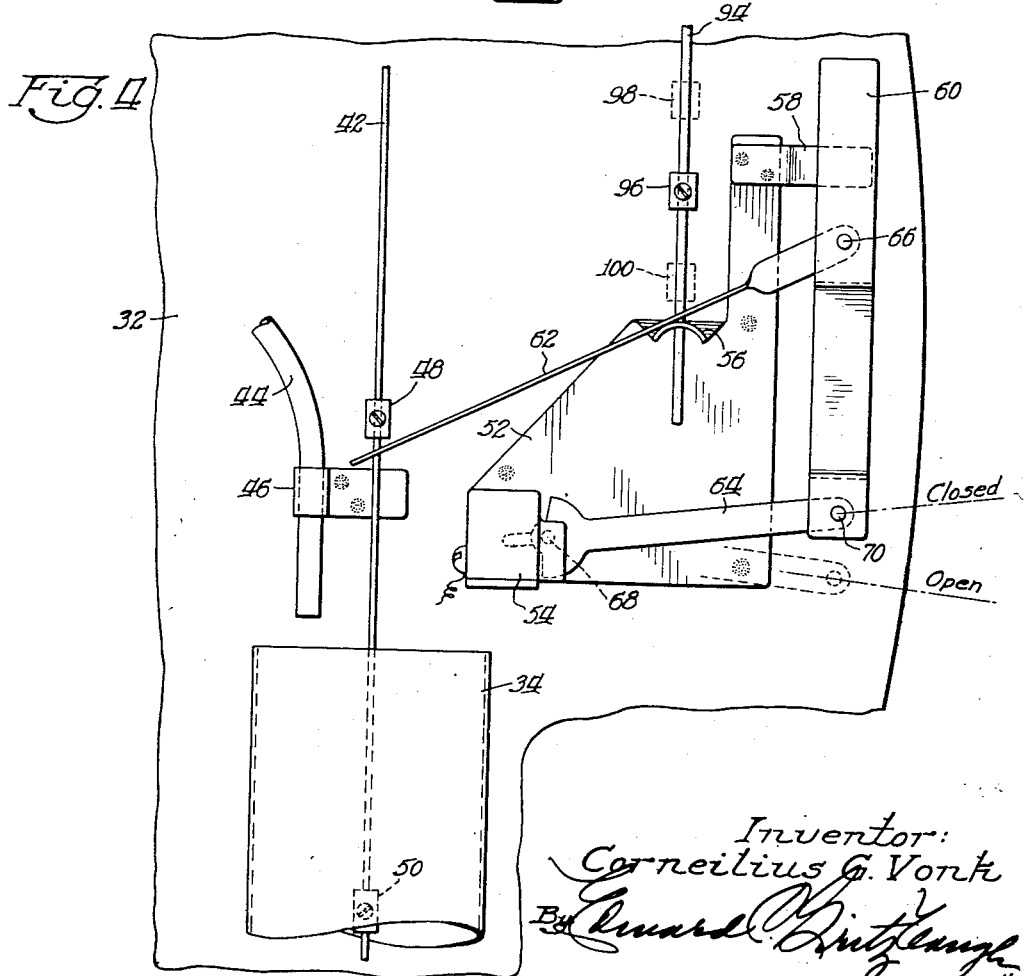
Inventor:
Corneilius G. Vonk Patented Sept. 8, 1953

2,651,693

UNITED STATES PATENT OFFICE 2,651,693

WATER VOLUME CONTROL

Corneilius G. Vonk, Herrin, Ill., assignor to Borg-Warner Corporation, Chicago, Ill., a corporation of Illinois Application May 19, 1948, Serial No. 27,960

10 Claims. (Cl. 200—84)

This invention has to do with a liquid level control for automatic washing machines and the like. More specifically, the invention is directed to the regulation of the amount of liquid to be used at any time in an automatic or semi-automatic cycle washer, and to preselective means securing said regulation in conjunction with the automatic controls for the washer.

Heretofore, in the performance of washing actions, even when there has been automatic sequential control, the only method of varying the liquid level has been a haphazard manual operation in which the mechanism controlling the inflow of water is moved manually to an advanced position so that less liquid is admitted to the tub. Such a method of operation has to be repeated each time the tub is charged, that is, for the soaking action, for the washing action, and for the various rinses. As a result, the automatic features of the machine are lost. Further, it is more or less guess work as to how much liquid will be admitted to the tub under such manual operation.

Many homes have a limited supply of water, and this is particularly true in the case of hot water. As a result, previous automatic washers have not met will full favor and especially the larger washers using a considerable amount of water.

It is an object of the present invention to provide an improved arrangement whereby the amount of liquid for automatic cycle or semi-automatic cycle washing machines may be preselected prior to operation of the machine.

Further, it is an object to provide an arrangement which is relatively inexpensive and which may be manufactured under modern conditions and with modern production machinery, the structure being rugged and practically foolproof.

It is an object of the present invention to provide an arrangement which overcomes objectionable features heretofore present in automatic washers, and particularly an object to overcome the objectionable features above referred to.

The invention consists of the novel constructions, arrangements, and devices to be hereinafter described and claimed for carrying out the above-stated objects and such other objects as will appear from the following description of a certain preferred embodiment illustrated in the accompanying drawings, wherein:

Fig. 1 is a front elevational view of a washing machine of the type known as a horizontal automatic, said machine showing on the front thereof an indicator knob and dial plate for liquid level settings;

Fig. 2 is a fragmentary rear elevational view of a washing machine tub showing the positioning of the water level control means thereof and certain of the parts therefor;

Fig. 3 is a top plan view of a preferred form of liquid level control mechanism as applied to the tub of a washing machine, the view being a fragmentary view;

Fig. 4 is a fragmentary elevational view of the rear of a washing machine tub, showing the structure of Fig. 3;

Fig. 5 is a view taken on the line 5—5 of Fig. 2 looking in the direction of the arrows; and Fig. 6 is a fragmentary elevational view of the structure of Fig. 5.

Like characters of reference designate like parts in the several views.

Referring more in detail to the various figures, and referring first to the structure shown in Fig. 1, I have here shown a preferred form of a liquid level control applied to an automatic washing machine tub of the so-called horizontal type. Such a washing machine is illustrated diagrammatically in Fig. 1. As shown in Fig. 1, there is the outer casing 20 which is frequently provided for washing machines of the automatic type and particularly of the horizontal automatic type.

Machines of this type are usually provided with a timer mechanism for actuating the valves and controlling the motor, etc. and operating mechanism of the device, the timer mechanism being regulatable from a shaft on which is located an indicator or dial. The details of such a structure are not important here, and the structure is indicated only schematically by means of the timer control knob 22. Such a structure, as would be suitable for the present device, is shown in such patents as Hall Patent No. 2,227,133, issued December 31, 1940; Jones Patent No. 2,155,271, issued April 19, 1939; and other patents and structures readily available in the prior art.

Usually in connection with an automatic washer for clothes, there is provided a liquid temperature valving means for regulating the temperature of the liquid, which comprises a mixing valve of any suitable character, the mixing valve being adapted to mix the hot and cold water to secure the desired uniform temperatures. There is indicated a liquid temperature selector 24, but details of the mixing valve are not important here. As shown in Fig. 1, both the timer control and temperature selector are located on the dial plate 26, on which would normally be graduations and markings. These are not indicated for the reason that they are not important in a description of the present invention.

For the proper manipulation of the liquid level control of this type, there is provided a liquid level selector 28, which is located on the front of the cabinet casing 20. The dial plate 30 is here shown as having the markings "L," "M," and "H" for three different positions, these being intended to indicate low, medium and high for the liquid level in the tub. Obviously, other markings and other locations for the liquid level selector would be equally applicable.

Referring to Figs. 2, 3, 4, and 5, the washing machine tube 32 has applied thereto the liquid level control. The washing machine tub 32 is ordinarily located inside the casing 20 in the conventional manner, as shown for example, in various prior art patents such as Fig. 8 of Chamberlin et al. Re. Patent No. 22,375.

Referring to Fig. 2, there is applied to the back or end surface of said tub 32 a float tank 34, which is mounted on the tub 32 by any convenient means, such as the bracket 36 (see also Fig. 3). The tank 34 is provided with means such as the conduit 38 whereby fluid from the tub 32 may be admitted to the tank 34 and will rise to the same level in the tank 34 as in the tub 32. The conduit 38 also serves as a means for draining the tank 34 when the tub 32 is drained.

The float 40, located within the tank 34, is adapted to rise and lower in response to the level of the fluid in the tank 34. The float 40 carries an upwardly extending rod 42, which is preferably made integral with the float 40. With this arrangement, as the liquid level varies, the rod 42 will be moved up or down with the float 40. It is ordinarily not necessary to provide a special guide for the rod 42, but one may be provided, if desired.

A pipe 44 from the mixing valve (not shown) is located to carry fluid into the tank 34. Fluid from the mixing valve will be carried into the tank 34 at the same time the tub 32 is charged from the same source, that is, from the mixing valve. Obviously, the pipe 44 must not be of such capacity that the float tank fills up substantially faster than the tub 32 and actuates the switch (in a manner to be described later) before the preselected liquid level is obtained. The pipe 44 may be held in place in any convenient manner, but I have shown for this purpose the bracket 46, best illustrated in Figs. 2, 3 and 4.

Referring primarily to Figs. 3 and 4, there is provided, on said rod 42, a pair of stops comprising the upper stop 48 and the lower stop 50. These may comprise projections of any type, but as here shown are ferrules or collars which are attached to the rod 42 by means of set screws (Fig. 4). The tub 32 is provided with a switch support bracket 52 which carries a toggle switch 54 and which is also provided with an outstanding projection forming a fulcrum 56, the purpose of which will appear later. The bracket 52 has formed, either integrally therewith, or attached thereto or in close association therewith, a supporting bracket projection 58 as shown in Figs. 3 and 4. This bracket may act as a guide for movable slide bar 60 the upper end of which is bifurcated to receive the outer end of the bracket 58 and which slide bar 60 is adapted to move in a generally vertical direction, up and down, and on which is pivoted a control arm 62 and a switch actuating arm 64. The control arm 62 normally is adapted to rest on the fulcrum 56 and acts as a lever thereon, as shown in Fig. 4, and pivot about the pin 66. The switch arm 64, in the arrangement shown here, is pivoted on the bracket 52 at 68, and is pivoted to the slide bar 60 by means of the pin 70.

Referring next primarily to Fig. 5 in conjunction with Figs. 4 and 6, there is provided a shaft 72, one end of which is secured to the liquid level selector 28 (the connection not being shown), which shaft in this instance is inside the cabinet or casing 20 and preferably across the top of the tub 32. The shaft is journaled in its other end on the projection 74, which is provided on the tub 32, as shown particularly in Fig. 2. By referring to Fig. 6 in conjunction with Fig. 5, it will be noted that the projection 74 has depressions or holes 76, 78 and 80 adapted to receive the detent ball 82. The detent ball 82 is mounted in a bracket 84 (preferably U-shaped as shown in Fig. 5), which bracket 84 is secured to the end of the shaft 72 by means of the bolt 86 and the pointed prongs 88, against which prongs the shaft 72 is tightly drawn by the bolt 86. This bracket may be secured in any other way desired, but the way shown here has proved to be satisfactory. The projection 74 likewise is provided with the stops 90 and 92, which limit the movement of the bracket 84 and thus prevent the liquid level control being forced past its predetermined limits of operation.

Pivoted on the bracket 84 is a depending bar 94 on which is mounted a stop 96. As shown in the dotted line position of Fig. 4, the stop 96 is adapted by movement of the liquid level selector 28, shaft 72, bracket 84, and depending bar 94 to adjustment at predetermined positions, such as the upper position 98, the center position, in which the stop 96 is shown in full line in Fig. 4; and the lower position 100. Preferably, the rod 42 passes through a slot or opening 102 in the control arm 62, and preferably the depending bar 94 has a rather loose passage through the fulcrum portion 56 of the bracket 52, and through a hole 104 in the control arm 62 (as shown in Figs. 3 and 4). The arrangement aligns the various parts but still leaves them free to move relative each to the other.

In the arrangement shown, movement induced by the weight of the stop 48 on the end of the control arm 62 is reflected across the fulcrum 56 and raises the slide bar 60 to the upper full line position shown in Fig. 4. This closes the switch 54 and thus enables the master switch (not shown) to actuate the water inlet control valve, or fluid charging means for the fluid receptacle, when the other automatic controls for the machine are operated, said switch 54 being electrically connected to said control valve or charging means through said master switch. Upon the movement of the float upwardly, the stop 50 will raise the control arm 62 into contact with the stop 96; and the pressure of the stop 96 acting as a fulcrum for the control arm together with the gravity action induced by the weight of the slide bar 60 and the control arm 62 will move the slidable bar 60 to the dotted line position of the switch arm 64 as shown in Fig. 4, thus opening the switch and terminating the water flow into the tank 34.

It is understood that much of the structure shown here, while illustrative of a proven structure, is capable of considerable variation. Among other things, the toggle switch 54 may be replaced with a different type of switch differently located. Other changes entirely feasible are obvious and could be made without departing from the sphere or scope of the present invention.

While I have described my invention in connection with certain specific embodiments thereof, it is to be understood that this is by way of illustration and not by way of limitation and the scope of my invention is defined solely by the appended claims which should be construed as broadly as the prior art will permit.

I claim:

1. A fluid level selector control mechanism for a liquid receptacle such as a washing machine tub comprising, a positionable stop means remotely disposed of said receptacle and selectively manually operable to different positions, and a float actuated electric switch operating mechanism comprising a float, an electric switch, a fulcrum, and means connected to said switch and caused to function as a lever on said stop means and said fulcrum alternately thereby actuating said electric switch, said float being adapted to be in open communication with said liquid receptacle, the operation of said float actuated switch mechanism being responsive to the differential of fluid level in said receptacle and the position of said stop means.

2. A float actuated electric switch operating mechanism including a float and a tank for said float, a switch, a fulcrum, and means connected to said switch and caused to function as a lever on said fulcrum by said float, in combination with stop positioning mechanism defining a fulcrum and remotely disposed of said float actuated electric switch operating mechanism and selectively manually operable to different positions, the operation of said float actuated switch mechanism being responsive to the differential of the fluid level in said tank and the position of said stop means.

3. A tank, a float in said tank, a variable preselective means including a positionable stop means remotely disposed of said receptacle, said stop means being manually operable to different positions, and an electric switch operating mechanism including a switch, a fulcrum, and means linked to said switch and slidably connected to said float and caused to function as a lever alternately between said stop means and said fulcrum when actuated by said float, the operation of said actuated switch mechanism being responsive to the differential of the fluid level in the tank and the position of the stop means.

4. A fluid actuated electric switch operating mechanism adapted to be in circuit with a valving means and effective to control the operation thereof comprising a switch, a fulcrum, a control arm linked at one end to said switch and caused to function as a lever alternately between a positionable stop means and said fulcrum, and fluid responsive means for causing said control arm to function as a lever, in combination with selector means including said stop means, said stop means being manually operable to different positions, the operation of said float actuated switch mechanism being responsive to the differential of the fluid level maintaining said float and the position of said stop means.

5. A float actuated electric switch operating mechanism for a liquid receptacle such as a washing machine tub comprising a float tank, float means in said float tank, an electrical switch means, mechanical lever means including a stationary fulcrum and a movable fulcrum in connection with said float means to actuate said switch means responsive to the fluid level in said float tank, and a positioning control mechanism remotely disposed of said float actuated electric switch mechanism and selectively manually operable to position said movable fulcrum to different positions, the operation of said float actuated switch mechanism being responsive to the differential of the fluid level in said tank and the position of said movable fulcrum.

6. A float actuated electric switch operating mechanism for effecting different predetermined liquid levels in a receptacle such as a washing machine tub comprising a float tank disposed adjacent said receptacle and in open communication therewith, a float in said tank, an upwardly extending rod on said float, switch means, a first lever means for a first fulcrum and a second fulcrum engageable by said rod responsive to the fluid level in the tank and effective to open said switch means when said lever means is in engagement with said first fulcrum and close said switch means when said lever is in engagement with said second fulcrum, and means fixedly connected to one of said fulcrums and slidably journalled to the other fulcrum and remotely disposed of said switch means and manually operable to position one of said fulcrums to different positions, the operation of said float actuated switch mechanism being responsive to the differential action of the fluid level in the tank and the position of said last mentioned fulcrum.

7. A float actuated electric switch operating mechanism adapted to effect different liquid levels in a receptacle such as a washing machine tub having an electric liquid charging means therefor, comprising a tank located adjacent said receptacle and adapted to be placed in open communication therewith, a float in said tank, an upwardly extending rod on said float and responsive to the fluid level in said tank, switch means in circuit with said liquid charging means and operable to control the operation of said liquid charging means, means engageable by said rod and connected to said slide bar effective to open and close said switch means, and means disposed remote from said tank for adjusting the position to which said rod and means connected to said slide bar effects the opening and closing of said switch means.

8. A fluid level selector control for a washing machine tub comprising a tank located adjacent said tub, adjustable means responsive to the fluid level in said tank, said adjustable means including a lever, a pair of fulcrums with said lever interposed therebetween, and a variable preselective means disposed remote from said tank, said variable preselective means being manually operable and connected to one of said fulcrums to move the same to different positions for variable times of closure of said switch.

9. Manually adjustable float actuated electric switch operating mechanism operable to predetermined liquid levels in a liquid receptacle having float means therein, said float means being sensitive to the volume of liquid in said receptacle, and mechanical lever means engageable with said float means and adapted for adjustment to predetermine the volume of liquid in said receptacle, said mechanical lever means including a bar, a movable fulcrum disposed on one side of said bar and a stationary fulcrum disposed on the side of said bar remote from said movable fulcrum, said float means causing said bar to function as a lever alternately on each of said fulcrums to determine the liquid level in the liquid receptacle.

10. Manually adjustable float actuated electric switch operating mechanism operable to predetermined liquid levels in a liquid receptacle having float means therein, said float means being sensitive to the volume of liquid in said receptacle, and mechanical lever means engageable with said float means and adapted for adjustment to predetermine the volume of liquid in said receptacle, said mechanical lever means including a bar, a movable fulcrum disposed on one side of said bar and a stationary fulcrum disposed on the side of said bar remote from said movable fulcrum, said float means causing said bar to function as a lever alternately on each of said fulcrums, selector means disposed remote of said receptacle but in connection with said mechanical lever means and including means to move said movable fulcrum thereby varying the distance between said fulcrums, whereby the volume of liquid in the receptacle is dependent upon the distance between said fulcrums as determined by said selector means.

CORNEILIUS G. VONK.

References Cited in the file of this patent

UNITED STATES PATENTS

| Number | Name | Date |
|---|---|---|
| Re. 22,375 | Chamberlin et al. | Sept. 14, 1943 |
| 1,234,354 | Leming et al. | July 24, 1917 |
| 1,488,237 | Durdin | Mar. 25, 1924 |
| 1,639,368 | Carroll | Aug. 16, 1927 |
| 1,941,815 | Ringstrom | Jan. 2, 1934 |
| 1,999,439 | Braun | Apr. 30, 1935 |
| 2,088,819 | Smulski | Aug. 3, 1937 |
| 2,346,259 | Hutchings | Apr. 11, 1944 |